ис009511745B2

United States Patent
Bex et al.

(10) Patent No.: US 9,511,745 B2
(45) Date of Patent: Dec. 6, 2016

(54) WIPER BLADE DEVICE

(75) Inventors: Koen Bex, Jeuk/Limburg Belgien (BE);
Helmut Depondt, Kessel-Lo (BE);
Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 194 days.

(21) Appl. No.: 14/129,816

(22) PCT Filed: May 21, 2012

(86) PCT No.: PCT/EP2012/059355
§ 371 (c)(1),
(2), (4) Date: Dec. 27, 2013

(87) PCT Pub. No.: WO2013/000624
PCT Pub. Date: Jan. 3, 2013

(65) Prior Publication Data
US 2014/0137358 A1 May 22, 2014

(30) Foreign Application Priority Data

Jun. 28, 2011 (DE) .................. 10 2011 078 172

(51) Int. Cl.
*B60S 1/38* (2006.01)
(52) U.S. Cl.
CPC ............ *B60S 1/3874* (2013.01); *B60S 1/3889* (2013.01); *B60S 1/381* (2013.01); *B60S 1/3881* (2013.01); *B60S 1/3887* (2013.01); *B60S 1/3894* (2013.01)
(58) Field of Classification Search
CPC ..... B60S 1/3881; B60S 1/3886; B60S 1/3887; B60S 1/3889; B60S 1/3891; B60S 1/13894; B60S 1/13896; B60S 1/3874; B60S 1/381

USPC .......... 15/250.43, 250.44, 250.451–250.454, 15/250.201
See application file for complete search history.

(56) References Cited

U.S. PATENT DOCUMENTS

| 2006/0037167 | A1 | 2/2006 | Nacamuli | |
| 2008/0127442 | A1* | 6/2008 | Jarasson | B60S 1/38 15/250.361 |
| 2008/0235896 | A1 | 10/2008 | Cheng | |
| 2009/0013492 | A1* | 1/2009 | Henin | B60S 1/38 15/250.452 |
| 2009/0106928 | A1* | 4/2009 | Lee | B60S 1/3808 15/250.361 |
| 2010/0064468 | A1* | 3/2010 | Kang | B60S 1/381 15/250.48 |

(Continued)

FOREIGN PATENT DOCUMENTS

| DE | 10000373 | * | 8/2001 |
| DE | 102008001152 A1 | * | 10/2009 |

(Continued)

OTHER PUBLICATIONS

International Search Report for Application No. PCT/EP2012/059355 dated Aug. 20, 2012 (English Translation, 2 pages).

*Primary Examiner* — Gary Graham
(74) *Attorney, Agent, or Firm* — Michael Best & Friedrich LLP

(57) ABSTRACT

The invention relates to a wiper blade device comprising at least one spring strip (10*a-e*), at least one wiper strip support (12*a-e*) and at least one end sealing unit (14*a-e*). According to the invention, the end sealing unit (14*a-e*) comprises at least two detent elements (16*a-e*, 18*a-e*) for fixing the spring strip (10*a-e*) and/or the wiper strip support (12*a-e*).

11 Claims, 13 Drawing Sheets

(56) References Cited

U.S. PATENT DOCUMENTS

2012/0030894 A1* 2/2012 Garrastacho ............ B60S 1/381
                   15/250.201

FOREIGN PATENT DOCUMENTS

| EP | 2123524 | 11/2009 |
|---|---|---|
| EP | 2127969 | 12/2009 |

* cited by examiner

WIPER BLADE DEVICE

BACKGROUND OF THE INVENTION

The invention relates to a wiper blade device.

A wiper blade device of a wiper blade for use on a motor vehicle is already known, comprising a spring strip, a wiper strip support and two end termination units. The end termination units are arranged at two ends of the spring strip and of the wiper strip support.

SUMMARY OF THE INVENTION

The invention starts from a wiper blade device having at least one spring strip, at least one wiper strip support and at least one end termination unit.

It is proposed that the end termination unit comprises at least two latching elements for fastening the spring strip and/or the wiper strip support.

Here, the term "spring strip" is intended to mean, in particular, a component part which has at least one extent that can be changed elastically in a normal operating state by at least 10%, in particular by at least 20%, preferably by at least 30%, and particularly advantageously by at least 50%, and which, in particular, produces a counterforce dependent on a change in the extent, which counterforce counteracts the change. In this context, the term "extent" of an element is intended, in particular, to mean a maximum distance between two points of a perpendicular projection of the element onto a plane. The spring strip is preferably of integral design. The term "integral" is intended, in particular, to mean materially connected, e.g. by means of a welding process and/or an adhesive bonding process etc., and particularly advantageously to mean formed on, as by being produced from a single molding and/or by being produced in a single- or multi-component injection molding process. The spring strip is preferably of elongate design. The spring strip is preferably composed at least partially of spring steel. In an unloaded state, the spring strip preferably has essentially the shape of a bent bar and, as a particularly advantageous possibility, of a flattened bent bar. As a particularly advantageous possibility, a curvature of the spring strip along a longitudinal extent in an unloaded state is greater than a curvature of a vehicle surface of a motor vehicle, in particular of a vehicle window over which the spring strip is guided in at least one operating state. The spring strip preferably has a latching element, in particular an aperture, which is in operative connection with at least one of the latching elements of the end termination unit in an assembled state. Here and below, the term "aperture" is intended, in particular, to mean an aperture in the material of a component extending, in particular, from a first surface of the component to an opposite second surface of the component.

A "wiper strip support" is intended, in particular, to mean a unit which is provided for the purpose of fastening a wiper strip on the spring strip. The term "provided" is intended, in particular, to mean specifically designed and/or equipped. The term "wiper strip" is intended, in particular, to mean a unit which has a wiper lip and a holding region for holding the wiper lip on the wiper strip support. In this context, the term "wiper lip" is intended to mean an element which is moved over the vehicle surface, in particular the vehicle window, during operation of the wiper blade device, preferably touching the surface during a complete movement and, as a particularly advantageous possibility, being pressed as uniformly as possible against the vehicle surface, in particular by the spring strip. The wiper lip is preferably of integral design and is preferably composed of a natural rubber and, as a particularly advantageous possibility, of a synthetic rubber. The wiper strip support is preferably distinct from a spring strip and is designed as a separate component. The wiper strip support is preferably composed at least partially of rubber and/or of an at least partially flexible plastic. The wiper strip support preferably comprises a receiving region for receiving and fastening the holding region of the wiper strip. The wiper strip support preferably additionally comprises a receiving region for holding a spoiler unit. In this context, the term "spoiler unit" is intended, in particular, to mean a unit which is provided for the purpose of deflecting a relative wind acting on the wiper blade device and/or of using said wind to press the wiper lip onto the vehicle surface. The spoiler unit is preferably composed at least partially of rubber and/or of an at least partially flexible plastic.

The term "end termination unit" is intended, in particular, to mean a unit which is provided for the purpose of being fastened on one end of the spring strip. In particular, the end termination unit is provided for the purpose of providing an end termination for a wiper blade comprising the wiper blade device in an assembled state. The end termination unit is preferably formed at least partially by a plastic. The end termination unit is preferably designed as an end cap, which engages around part of the spring strip, especially in at least one assembled state. The wiper blade device preferably comprises just two end termination units, one for each end of the spring strip. The term "latching element" is intended, in particular, to mean an element which is provided for the purpose of producing a latching connection in interaction with a further latching element. At least one of the latching elements is preferably embodied as a latching hook which, in particular, has a partial area that is moved in a direction perpendicular to the spring strip during a latching operation and/or changes an extent in a direction perpendicular to the spring strip. In this context, a direction "perpendicular to the spring strip" is intended, in particular, to mean a direction perpendicular to a longitudinal extent of the spring strip.

By means of such an embodiment, advantageously stable retention of the end termination unit can be achieved. Thus, it is possible, in particular, to provide largely waggle-free fastening of the end termination unit on the spring strip and/or on the wiper strip support.

In a preferred embodiment of the invention, it is proposed that the spring strip and the wiper strip support are fixed on the end termination unit by means of the latching elements. In this context, the phrase "the spring strip and the wiper strip support are fixed on the end termination unit by means of the latching elements" is intended, in particular, to mean that merely mounting the spring strip and the wiper strip support on the end termination unit by means of the latching elements is sufficient to connect the three components securely to one another. In particular, it is possible to eliminate the use of further components for fastening the spring strip and the wiper strip support on the end termination unit. In particular, the spring strip can be fixed on the end termination unit by means of the wiper strip support or, alternatively, the wiper strip support can be fixed on the end termination unit by means of the spring strip. The spring strip and the wiper strip support can furthermore each be fastened independently directly on the end termination unit. Advantageously simple assembly can thereby be made possible. Moreover, the number of components can be reduced.

It is advantageous if the latching elements are formed on the end termination unit. The end termination unit together with the latching elements is preferably produced as a single molding. In this way, advantageously simple production of the end termination unit together with the latching elements can be made possible.

It is furthermore proposed that at least one latching element is arranged in at least one side region of the end termination unit. The phrase "side region of the end termination unit" is intended, in particular, to mean a spatial region of the end termination unit, the principal plane of extent of which is arranged at least substantially perpendicular to the spring strip and, in particular, next to the spring strip in an assembled state. Here, a direction which is "at least substantially perpendicular" to a reference direction is intended, in particular, to mean a direction which is at an angle of between 80° and 100°, in particular between 85° and 95°, and preferably exactly 90°, to the reference direction. In this context, the statement that a spatial region is arranged "next to the spring strip" is intended, in particular, to mean that an infinite extension of the spring strip in the direction of an axis of curvature intersects the spatial region. The term "axis of curvature" of the spring strip is intended, in particular, to mean an axis which is perpendicular to an arbitrary surface normal of a largest smooth surface of the spring strip. As a preferred option, each of two latching elements is arranged on opposite side regions, in particular on opposite side walls, of the end termination unit. It is thereby advantageously possible to achieve largely waggle-free fastening of the spring rail and/or of the wiper strip support on the end termination unit.

If at least one of the latching elements is designed as a latching hook, an advantageously simple design can be made possible since it is possible to provide only simple latching elements, preferably apertures, on the spring rail and/or on the wiper strip support.

In another embodiment of the invention, it is proposed that the end termination unit has at least one aperture to increase flexibility of the latching hooks. The aperture is preferably embodied as a lateral notch, in particular as a slot-shaped notch, preferably in a side region of the end termination unit. This enables a partial area of the end termination unit, in particular a lateral partial area, to serve as a latching element, thereby making it possible to achieve an advantageously simple and low-cost design.

If the end termination unit has a receiving region for the wiper strip, which region, in an assembled state, continues a receiving region, arranged on the wiper strip support, for the wiper strip, particularly simple retention can be achieved, especially in an end region of the wiper strip.

It is furthermore proposed that the wiper strip support has at least one latching element for fastening the end termination unit. The latching element of the wiper strip support is preferably designed as an aperture, in particular as a lateral aperture, interacting, in particular, with the end termination unit latching element designed as a latching hook. It is thereby advantageously possible to simplify a design of the wiper strip support.

BRIEF DESCRIPTION OF THE DRAWINGS

Further advantages will become apparent from the following description of the drawing. The drawing shows illustrative embodiments of the invention. The drawing, the descriptions and the claims contain numerous features in combination. A person skilled in the art will expediently also consider the features individually and combine them into worthwhile further combinations.

In the drawing.

DETAILED DESCRIPTION

Figure 1:
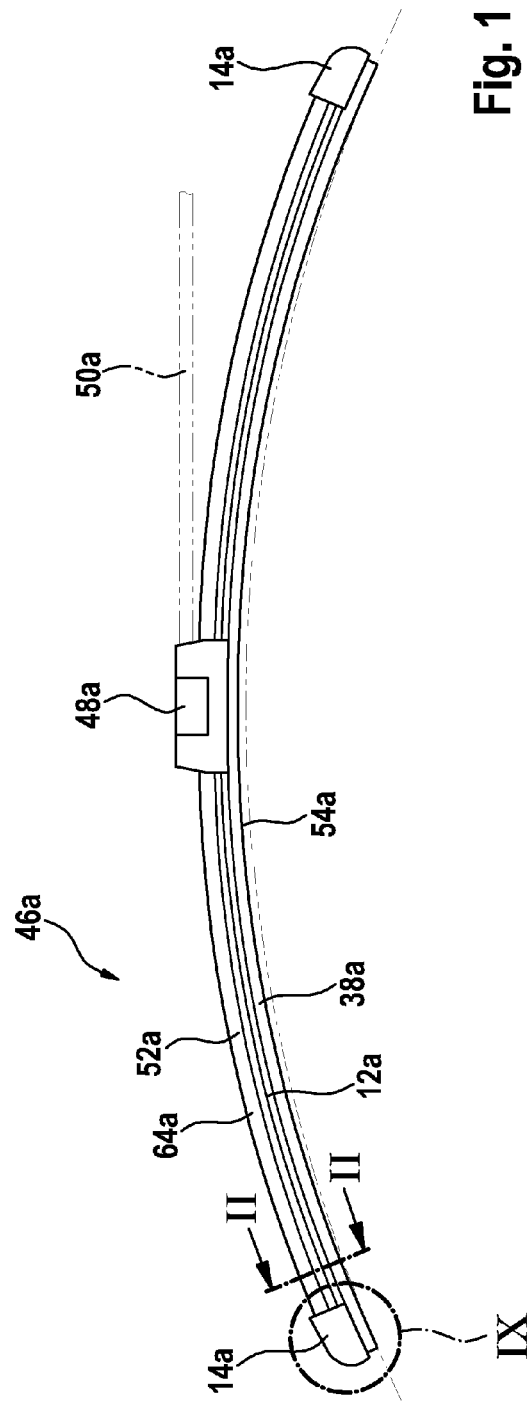
FIG. 1 shows a wiper blade having a wiper blade device in a schematic illustration.

FIG. 1 shows schematically a wiper blade 46a having a wiper blade device according to the invention. The wiper blade 46a has an adapter 48a, which is provided for mounting the wiper blade 46a on a wiper arm 50a, depicted in dashed lines, of a window wiper system of a motor vehicle.

Figure 2:
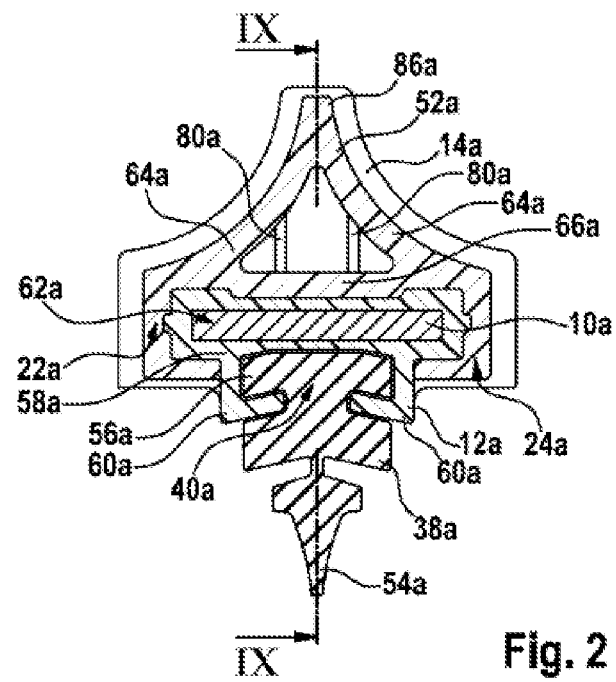
FIG. 2 shows the wiper blade device from FIG. 1 in a section along a line II-II in FIG. 1.

FIG. 2 shows the wiper blade device in a sectional view along a line II-II in FIG. 1. The wiper blade device comprises a spring strip 10a of spring steel extended lengthwise in the form of a strip and curved. The wiper blade device furthermore has a wiper strip support 12a composed of a flexible plastic, a wiper strip 38a composed of a synthetic rubber, and a spoiler unit 52a composed of a partially flexible plastic. As can be seen from FIG. 1, the wiper strip support 12a, the wiper strip 38a and the spoiler unit 52a are of elongate design and are arranged parallel to the spring strip 10a in an assembled state. The spring strip 10a is provided for the purpose of pressing a wiper lip 54a of the wiper strip 38a in a largely uniform manner against a surface to be wiped during operation of the window wiper system. For this purpose, a curvature of the spring strip 10a is designed in such a way that, in an unloaded state, it is greater than a maximum curvature occurring on the surface to be wiped. The wiper strip support 12a is provided for the purpose of connecting the wiper strip 38a securely to the spring strip 10a and transmitting any side forces which occur during wiping from the wiper strip 38a to the spring strip 10a. The spoiler unit 52a ensures an increased contact pressure of the wiper blade 46a on the surface and prevents the wiper blade 46a from lifting off from the surface owing to the relative wind when the motor vehicle is moving quickly. The wiper blade 46a is closed off at both ends by an end termination unit 14a of the wiper blade device. In this arrangement, the end termination unit 14a, which is designed as an end cap, in each case receives end regions of the spring strip 10a, of the wiper strip support 12a and of the spoiler unit 52a (cf. FIG. 9).

According to FIG. 2, the wiper strip support 12a has an at least substantially rectangular form when viewed in cross section, wherein a receiving region 40a for a support element 56a of the wiper strip 38a is arranged on a rectangle side 58a of a rectangle which faces the wiper strip 38a in an assembled state. The receiving region 40a is bounded by two hook-type extensions 60a and by the rectangle side 58a. The rectangle surrounds a receiving region 62a for the spring strip 10a. When viewed in cross section, the spoiler unit 52a has at least substantially the shape of an isosceles triangle (cf. FIG. 2). Triangle sides 64a of the triangle are extended beyond a base side 66a of the triangle and, in an assembled state, engage positively around an edge region of the wiper strip support 12a. In this region, a surface of the wiper strip support 12a is matched to a surface of the spoiler unit 52a. In order to improve their wind-guiding properties, the triangle sides 64a have a slightly concave curvature when viewed from the outside.

Figure 3:
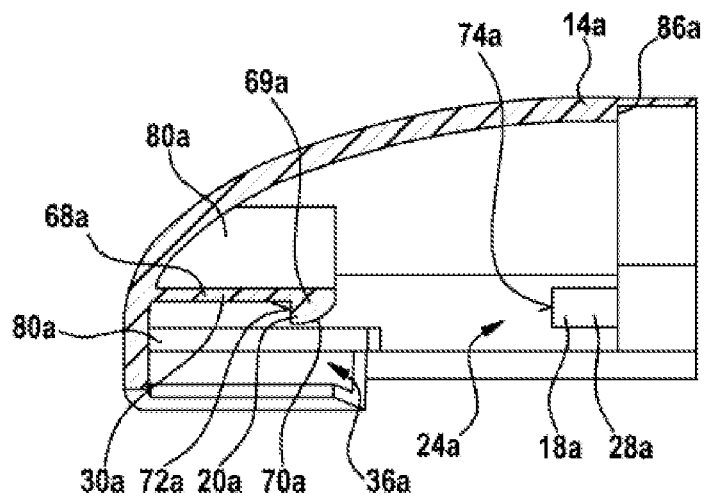
FIG. 3 shows an end termination unit of the wiper blade device from FIG. 1 in a sectional view.
Figure 5:
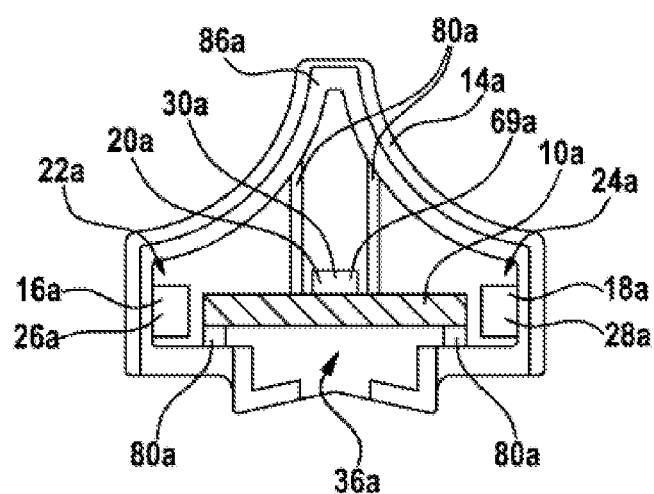
FIG. 5 shows the end termination unit and the spring strip of the wiper blade device from FIG. 1 in another sectional view.

FIG. 3 shows the end termination unit 14a in an unassembled state in a sectional view from the side. The end termination unit 14a is composed of an at least partially flexible plastic. The end termination unit 14a comprises a latching element 20a for fastening the spring strip 10a. The end termination unit 14a additionally comprises two further latching elements 16a, 18a (cf. FIG. 5) for fastening the wiper strip support 12a. The latching elements 16a, 18a, 20a are designed as latching hooks 26a, 28a, 30a and are formed integrally on the end termination unit 14a. The latching elements 16a, 18a for fastening the wiper strip support 12a are each arranged in a side region 22a, 24a of the end termination unit 14a, more specifically in mutually opposite side regions 22a, 24a of the end termination unit 14a. Both the spring strip 10a and the wiper strip support 12a are fixed directly on the end termination unit 14a by the latching elements 16a, 18a, 20a. Latching hook 30a comprises a spring web 68a, which, at a first end, is formed on an end face of the end termination unit 14a and, at a second end, merges into a latching body 69a. The latching body 69a has a run-on bevel 70a. On a side remote from the run-on bevel 70a, the latching body 69a has a latching surface 72a. The latching surface 72a has a surface normal which lies parallel to a principal plane of extent of the spring strip 10a in the end region thereof in an assembled state. The lateral latching hooks 26a, 28a are designed as wings projecting from a side wall of the end termination unit 14a. Latching hooks 26a, 28a each have a latching surface 74a, 76a.

Figure 4:
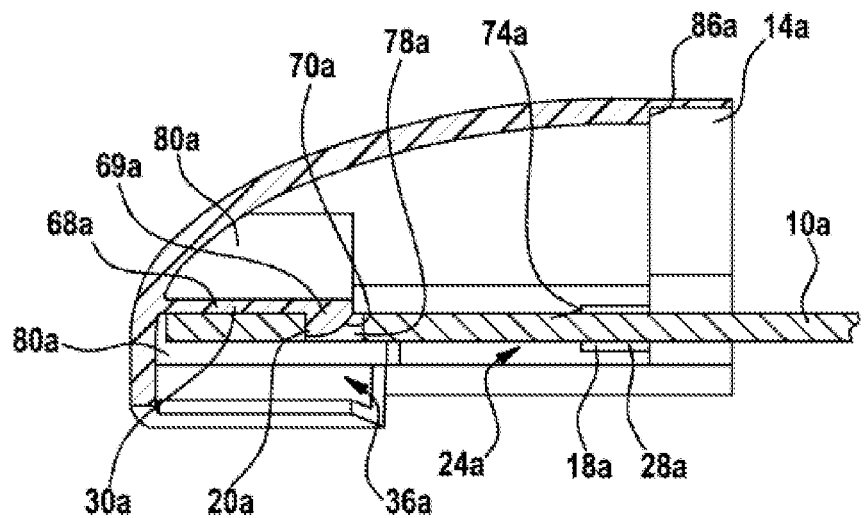
FIG. 4 shows the end termination unit and a spring strip of the wiper blade device from FIG. 1 in a sectional view.
Figure 6:
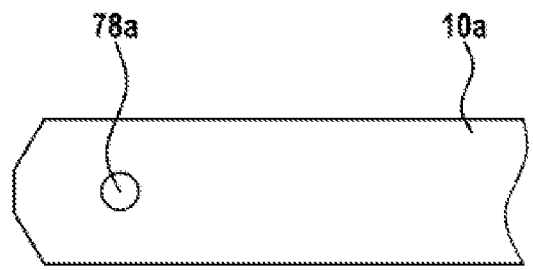
FIG. 6 shows the spring strip of the wiper blade device from FIG. 1 in a plan view.

FIG. 4 shows the end termination unit 14a with the spring strip 10a mounted, in a sectional view, wherein the wiper strip support 12a, the wiper strip 38a and the spoiler unit 52a are not shown in FIG. 4 for the sake of greater clarity. Once the latching connection has been established, latching hook 30a engages in a latching aperture 78a in the spring strip 10a (cf. FIG. 6). In the present example, the latching aperture 78a is of circular design. As the spring strip 10a is being mounted on the end termination unit 14a, the spring strip 10a is introduced along guide strips 80a of the end termination unit 14a (cf. FIG. 5). By means of the run-on bevel 70a, latching hook 30a is deformed elastically as the spring strip 10a is introduced and, finally, snaps into the latching aperture 78a when the latching aperture 78a of the spring strip 10a and the latching body 69a are arranged one above the other. Once the latching connection has been established, the spring strip 10a is prevented from being pulled out of the end termination unit 14a since the latching surface 72a of latching hook 30a is in operative connection with a corresponding surface of the spring strip 10a bounding the latching aperture 78a (cf. FIG. 4).

Figure 7:
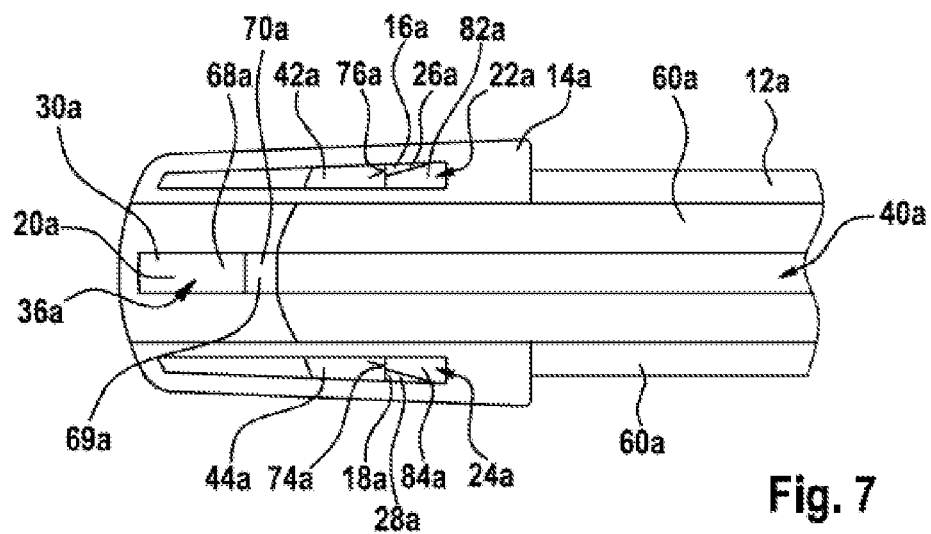
FIG. 7 shows the end termination unit and a wiper strip support of the wiper blade device from FIG. 1 in a plan view from below.
Figure 8:
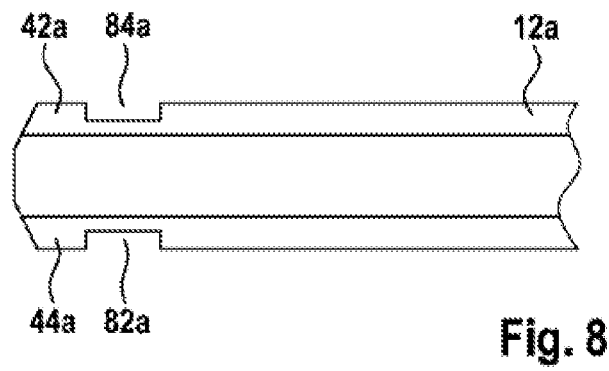
FIG. 8 shows the wiper strip support of the wiper blade device from FIG. 1 in a plan view.

FIG. 7 shows the end termination unit 14a with the wiper strip support 12a mounted in a plan view from below, wherein the spring strip 10a, the wiper strip 38a and the spoiler unit 52a are not shown for the sake of greater clarity. The wiper strip support 12a comprises two latching elements 42a, 44a in the form of two latching apertures 82a, 84a, corresponding to the two latching hooks 26a, 28a, for fastening the end terminal unit 14a. The latching apertures 82a, 84a are designed as lateral apertures in the wiper strip support 12a (cf. FIG. 8).

Owing to the latching apertures 82a, 84a, a cross section of the wiper strip support 12a deviates from the above-described largely rectangular cross section in the region of the apertures 82a, 84a. Owing to the latching apertures 82a, 84a, the receiving region 62a for the spring strip 10a is open at the sides. As the wiper strip support 12a is introduced into the end termination unit 14a, latching hooks 26a, 28a, which are designed as wings, are deformed elastically by the wiper strip support 12a and come to rest on the side walls of the end termination unit 14a. As soon as the latching apertures 82a, 84a are arranged above latching hooks 26a, 28a, latching hooks 26a, 28a return to the normal position thereof. Once the latching connection has been established, the latching surfaces 74a, 76a of latching hooks 26a, 28a thus rest on corresponding surfaces bounding the latching apertures 82a, 84a and, in this way, prevent the wiper strip support 12a from being pulled out of the end termination unit 14a. According to FIG. 7, the end termination unit 14a has a receiving region 36a for the wiper strip 38a, which region, in an assembled state, continues the receiving region 40a arranged on the wiper strip support 12a. It is thereby possible to achieve secure retention of the wiper strip 38a, particularly in an end region of the wiper strip 38a.

Figure 9:
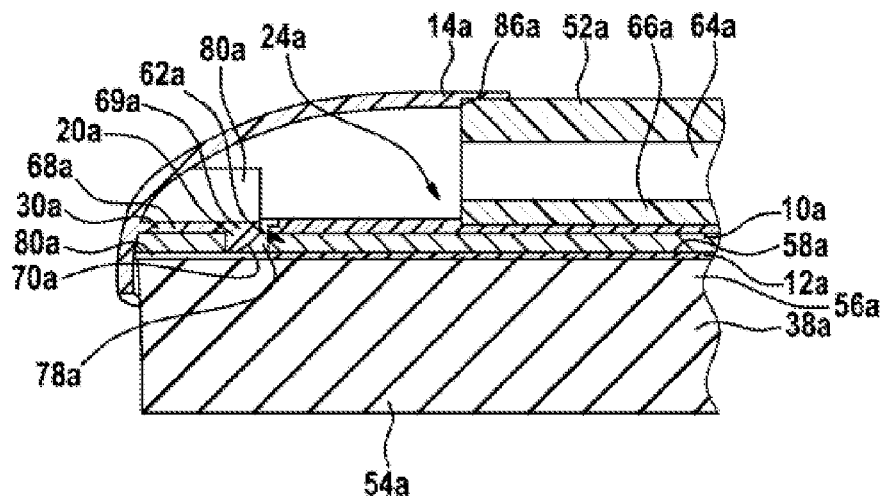
FIG. 9 shows the wiper blade device from FIG. 1 in a sectional view along a line IX-IX in FIG. 2.

FIG. 9 shows the wiper blade device in a sectional view along a line IX-IX in FIG. 2. A position of the spoiler unit 52a parallel to the spring strip 10a is defined by abutment of the spoiler unit 52a against a stop edge 86a of the end termination unit 14a. In an inner region, the end termination unit 14a is shaped in such a way that the wiper strip support 12a with the spoiler unit 52a mounted thereon fits positively into the end termination unit 14a (cf. FIG. 2). Use can be made here, in particular, of additional spacer webs, it being possible to provide these, in particular, to compensate for manufacturing and/or assembly tolerances.

Four further illustrative embodiments of the invention are shown in FIGS. 10 to 26. The descriptions below are limited essentially to the differences between the illustrative embodiments, it being possible to refer to the description of the other illustrative embodiments, in particular FIGS. 1 to 9, in respect of components, features and functions which remain the same. To distinguish the illustrative embodiments, the letter a in the reference signs for the illustrative embodiment in FIGS. 1 to 9 is replaced by the letters b, c, d and e in the reference signs for the illustrative embodiments in FIGS. 10 to 26. In respect of components designated in the same way, especially in respect of components with the same reference signs, reference can basically also be made to the figures and/or to the descriptions of the other illustrative embodiments, in particular to FIGS. 1 to 9.

Figure 10:
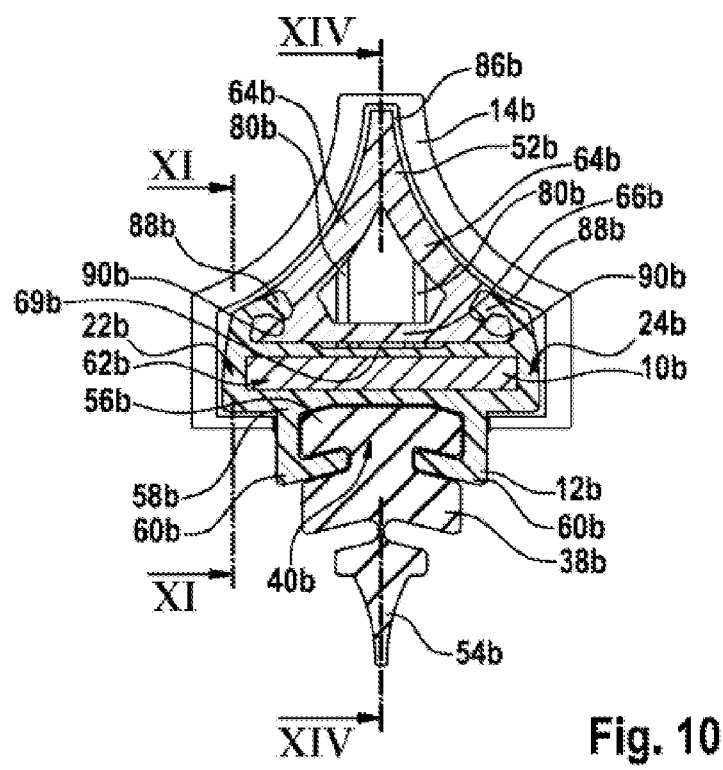
FIG. 10 shows another wiper blade device in a sectional view.

FIG. 10 shows another wiper blade device. Here, a wiper strip support 12b has a similar shape to that in the previous illustrative embodiment, when viewed in cross section. However, instead of a spoiler unit 52b engaging around the wiper strip support 12b to establish a positive connection, two holding strips 88b are here formed on a rectangle side opposite to a rectangle side 58b, said holding strips 88b engaging in corresponding holding grooves 90b of the spoiler unit 52b. When viewed in cross section, the spoiler unit 52b has at least substantially the shape of an isosceles triangle. The holding grooves 90b are formed on the respective ends, facing a base side 66b, of triangle sides 64b.

Figure 11:
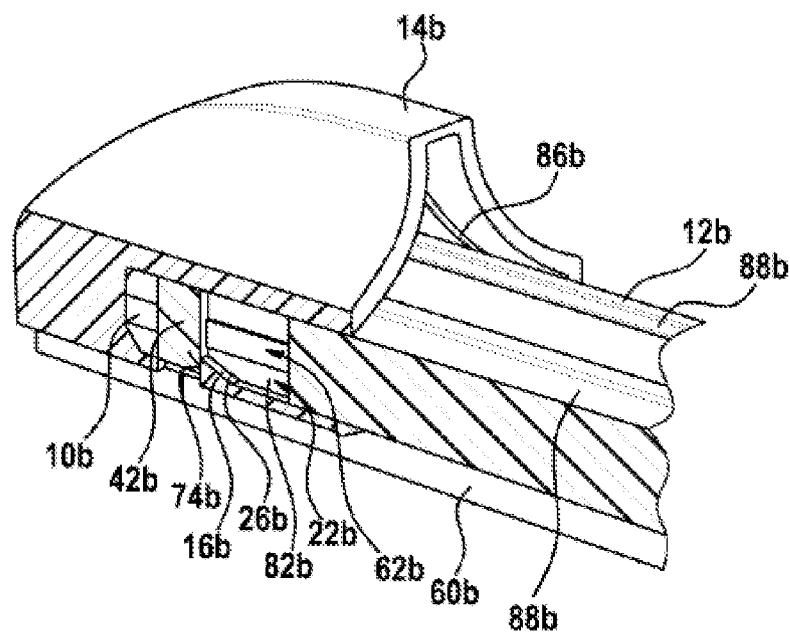
FIG. 11 shows an end termination unit, a spring strip and a wiper strip support of the wiper blade device from FIG. 10 in an isometric sectional view.
Figure 12:
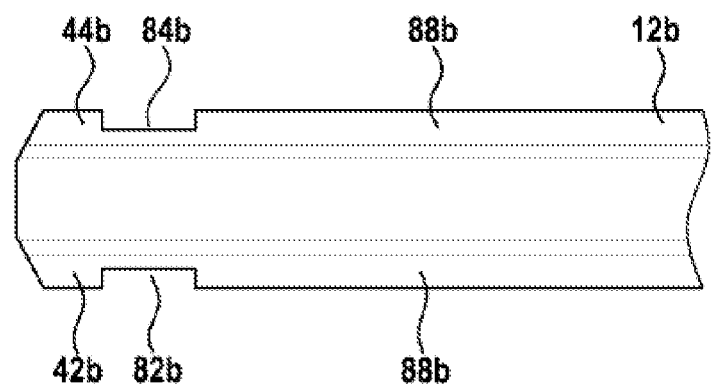
FIG. 12 shows the wiper strip support of the wiper blade device from FIG. 10 in a plan view.

FIG. 11 shows an isometric sectional view of an end termination unit 14b with a mounted spring strip 10b and the mounted wiper strip support 12b along a line XI-XI in FIG. 10, wherein the spoiler unit 52b and a wiper strip 38b are not shown in FIG. 11 for the sake of clarity. The end termination unit 14b has two latching elements 16b, 18b, which are designed as latching hooks 26b, 28b and are each arranged in a side region 22b, 24b of the end termination unit 14b. The latching hooks 26b, 28b are formed on a base of the end termination unit 14b, said base facing the wiper strip 38b in an assembled state. When the base is viewed from the side, the latching hooks 26b, 28b have a solid, triangular shape. The latching hooks 26b, 28b comprise a run-on bevel and a latching surface 74b, 76b on a side of the latching hooks 26b, 28b which faces away from the run-on bevel. As in the previous illustrative embodiment, the wiper strip support 12b has two lateral latching apertures 82b, 84b corresponding to the latching hooks 26b, 28b (cf. FIG. 12). As the wiper strip support 12b is being mounted on the end termination unit 14b, the latching hooks 26b, 28b and also parts of the base are deformed elastically by insertion of the wiper strip support 12b. As soon as the latching hooks 26b, 28b are arranged above the latching apertures 82b, 84b, the latching hooks 26b, 28b and the base return to the initial position thereof. Once the latching connection has been established, the latching surfaces 74b, 76b of the latching hooks 26b, 28b thus rest on corresponding surfaces bounding the latching apertures 82b, 84b and in this way prevent the wiper strip support 12b from being pulled out of the end termination unit 14b.

Figure 13:
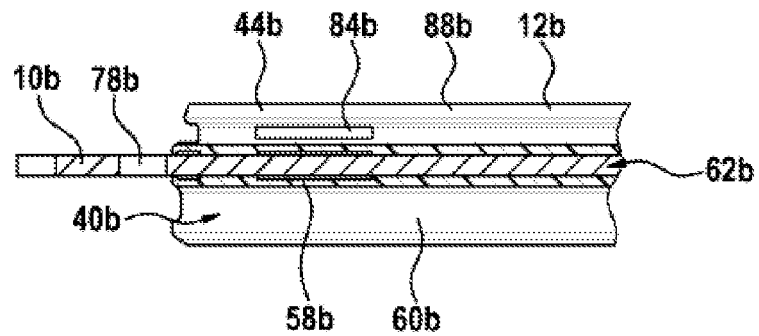
FIG. 13 shows the spring strip and the wiper strip support of the wiper blade device from FIG. 10 in an unassembled state in a sectional view.
Figure 14:
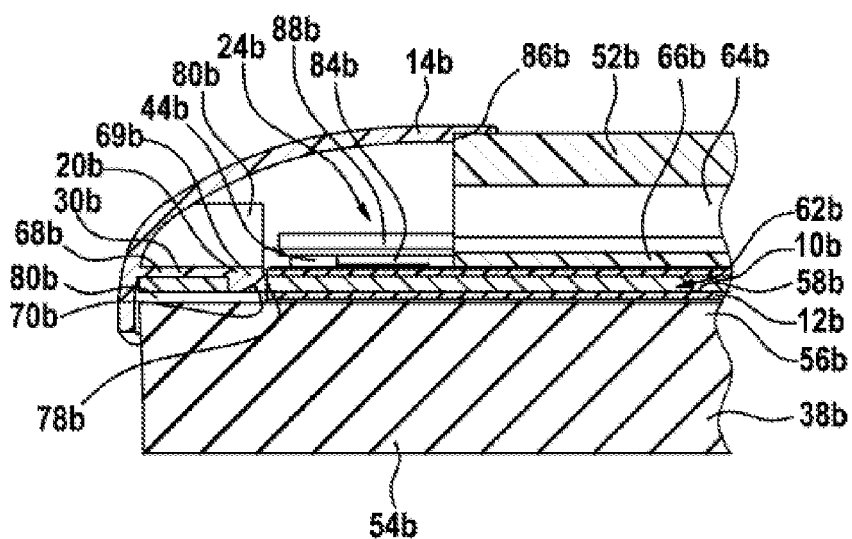
FIG. 14 shows the wiper blade device from FIG. 10 in a sectional view along a line XIV-XIV in FIG. 10.

FIG. 13 shows a sectional view of the wiper strip support 12b with the spring strip 10b inserted. It is clearly apparent how a receiving region 62b for the spring strip 10b is open at the sides in the region of the latching apertures 82b, 84b by virtue of the latching apertures 82b, 84b. FIG. 14 shows the wiper blade device in a sectional view along a line XIV-XIV in FIG. 10.

Figure 15:
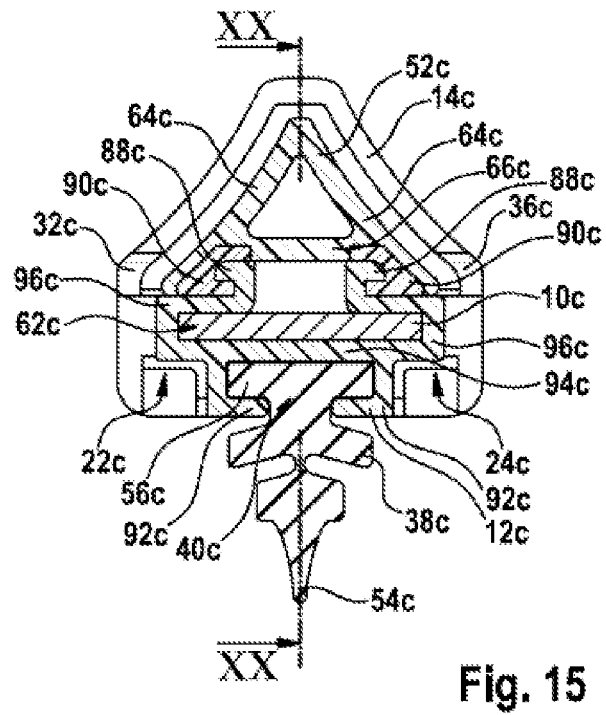
FIG. 15 shows another wiper blade device in a sectional view.

FIG. 15 shows another embodiment of a wiper blade device. When viewed in cross section, a wiper strip support 12c has an at least substantially H-shaped form. When viewed in cross section, ends of the wiper strip support 12c are bent around to form receiving regions 40c, 62c and holding strips 88c. Receiving region 40c is provided to receive a support element 56c of a wiper strip 38c. Region 62c is provided to receive a spring strip 10c. The holding strips 88c are provided for holding a spoiler unit 52c. Receiving region 40c is formed on a part of the H-shaped cross section of the wiper strip support 12c which faces the wiper strip 38c. When viewed in cross section, the lower H legs 92c of the wiper strip support 12c which face the wiper strip 38c are bent around toward one another. In an end region, the lower H legs 92c of the wiper strip support 12a are aligned parallel to one another and parallel to an H beam 94c. A cavity open in the direction of the wiper strip 38c is thereby formed, into which cavity the support element 56c of the wiper strip 38c fits positively. Receiving region 62c and the holding strips 88c are formed on a part of the H-shaped cross section of the wiper strip support 12a which faces the spoiler unit 52c. From the H beam 94c, the upper H legs 96c, which face the spoiler unit 52c, initially extend outward on both sides parallel to the H beam 94c and are then bent over at right angles in a direction toward the spoiler unit 52c. After covering a distance corresponding to the thickness of the spring strip 10c, the upper H legs 96c are once again bent over at right angles, more specifically toward one another. After covering a further distance, the upper H legs 96c are once again redirected through 90° in a direction away from the H beam 94c. After covering a further distance, the upper H legs 96c are bent over outward at right angles in a direction away from a center of gravity of the area of the cross section of the wiper strip support 12c. A cavity, which is open toward the spoiler unit 52c, is formed directly above the H beam 94c, into which cavity the spring strip 10c fits positively. The folded-over ends of the upper H legs 96c form the holding strips 88c, which engage in corresponding holding grooves 90c of the spoiler unit 52c.

When viewed in cross section, the spoiler unit 52c has at least substantially the form of an isosceles triangle (cf. FIG. 15). Triangle sides 64c of the triangle are extended beyond a base side 66c of the triangle and there have the holding grooves 90c. In a region of the holding grooves 90c, the spoiler unit 52c is composed of a harder plastic in comparison with the remaining regions of the spoiler unit 52c. It is thereby possible to ensure secure retention of the holding grooves 90c on the holding strips 88c of the wiper strip support 12c. There is furthermore the possibility of simplifying the pushing of the spoiler unit 52c onto the wiper strip support 12c during assembly of a wiper blade 46c. To improve the wind guiding properties of the triangle sides 64c, they have a slightly concave curvature when viewed from the outside.

Figure 16:
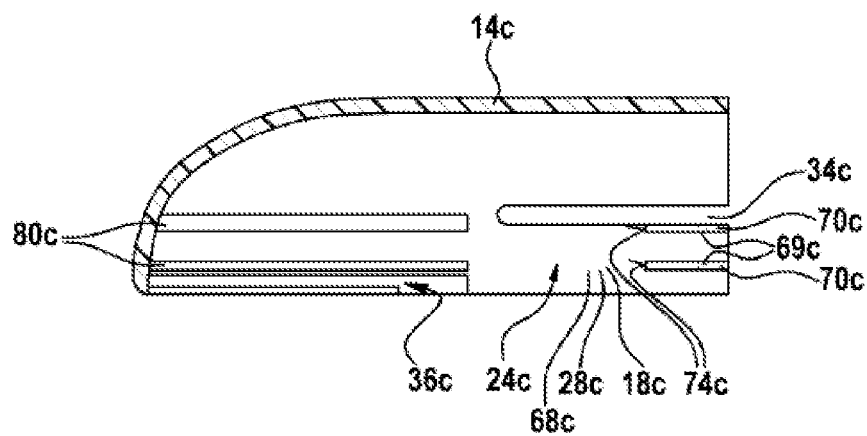
FIG. 16 shows an end termination unit of the wiper blade device from FIG. 15 in a sectional view.

FIG. 16 shows a sectional view of an end termination unit 14c in a disassembled state. The end termination unit 14c has guide strips 80c. The guide strips 80c are formed on mutually opposite side walls of the end termination unit 14c and are provided for the purpose of guiding the spring strip 10c. Two latching elements 16c, 18c designed as latching hooks 26c, 28c are formed integrally on the end termination unit 14c. The latching hooks 26c, 28c are formed on mutually opposite side walls of the end termination unit 14c. The latching hooks 26c, 28c each comprise a spring web 68c and latching bodies 69c adjoining the spring web 68c. The latching bodies 69c are designed as flat plates which continue the guide strips 80c. The latching bodies 69c each have a run-on bevel 70c facing the spring strip 10c in an assembled state. In a direction away from the run-on bevels 70c, the latching bodies 69c each have a latching surface 74c, 76c. The end termination unit 14c furthermore comprises respective apertures 32c, 34c adjacent to the latching hooks 26c, 28c to increase flexibility of the latching hooks 26c, 28c. The apertures 32c, 34c are formed by lateral notches in the end termination unit 14c.

Figure 17:
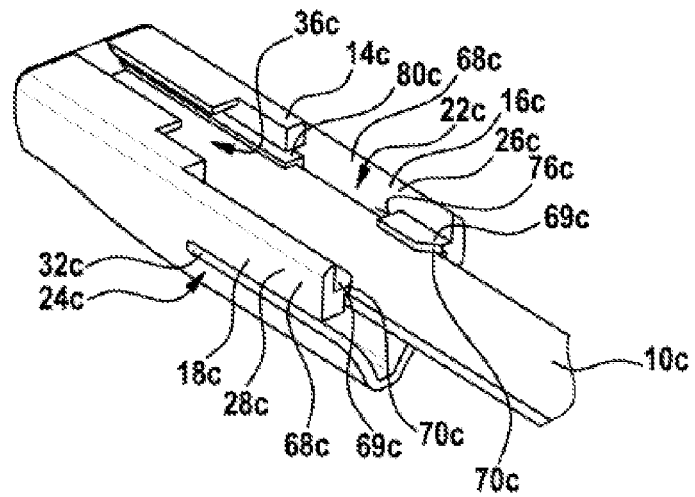
FIG. 17 shows the end termination unit and a spring strip of the wiper blade device from FIG. 15 in an isometric view from below.
Figure 18:
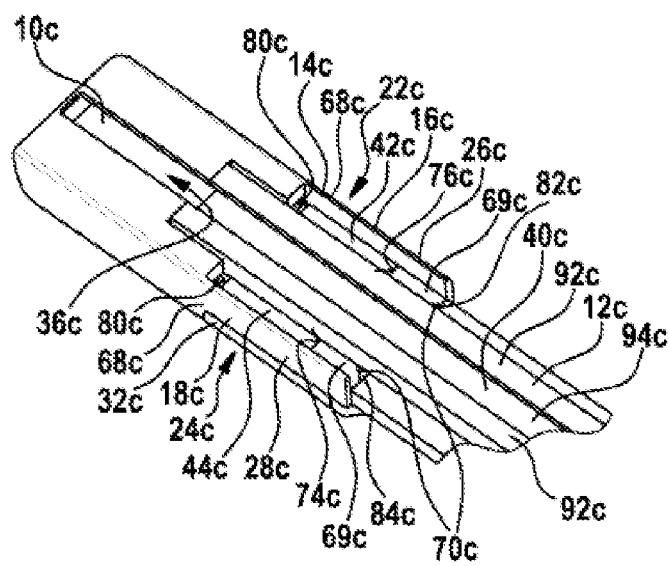
FIG. 18 shows the end termination unit, the spring strip and a wiper strip support of the wiper blade device from FIG. 15 in an isometric view from below.
Figure 19:
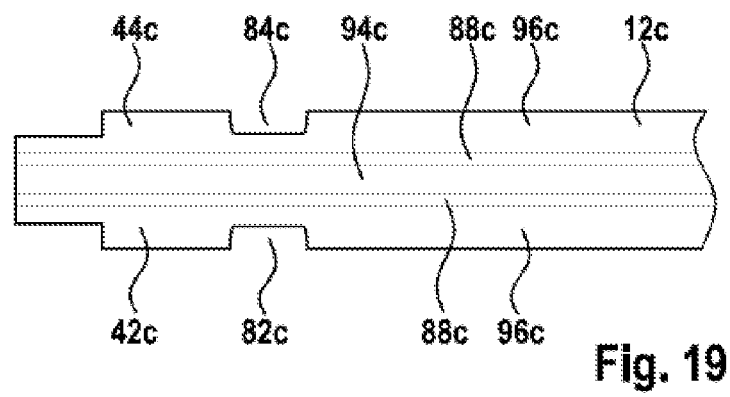
FIG. 19 shows the wiper strip support of the wiper blade device from FIG. 15 in a plan view.

FIG. 17 shows the end termination unit 14c with the spring strip 10c installed in an isometric view obliquely from below, wherein the wiper strip support 12c, the wiper strip 38c and the spoiler unit 52c are not shown in FIG. 17 for the sake of greater clarity. In the illustrative embodiment under consideration, the spring strip 10c is free of any latching elements. During assembly, the spring strip 10c is introduced in the direction defined by the latching bodies 69c and the guide strips 80c. As shown in FIG. 18, the wiper strip support 12c is then pushed onto the spring strip 10c. In this illustrative embodiment too, the wiper strip support 12c has two lateral latching apertures 82c, 84c interacting with the latching hooks 26c, 28c (cf. FIG. 19). By pushing the wiper strip support 12c on against the run-on bevels 70c of the latching bodies 69c, said bodies are spread elastically, allowing the wiper strip support 12c to be accommodated between the latching bodies 69c. As soon as the latching bodies 69c are arranged above the latching apertures 82c, 84c, the latching hooks 26c, 28c snap back into the initial position thereof. Once the latching connection has been established, the latching surfaces 74c, 76c of the latching bodies 69c rest on corresponding surfaces bounding the latching apertures 82c, 84c and, in this way, prevent the wiper strip support 12c from being pulled out of the end termination unit 14c.

Figure 20:
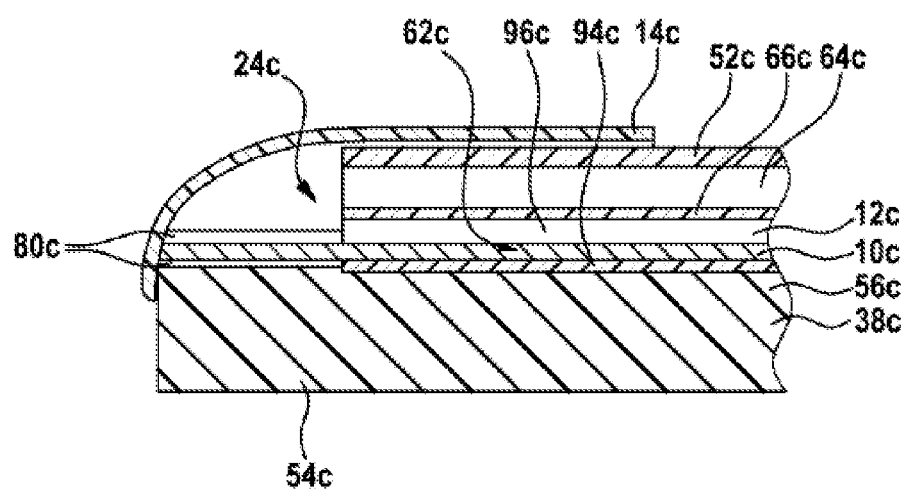
FIG. 20 shows the wiper blade device from FIG. 15 in a sectional view along a line XX-XX in FIG. 15.

FIG. 20 shows the wiper blade device in a sectional view along a line XX-XX in FIG. 15. A position of the spoiler unit 52c parallel to the spring strip 10c is defined by abutment of the spoiler unit 52c against an outer wall of the end termination unit 14c. In an inner region, the end termination unit 14c is shaped in such a way that the wiper strip support 12c with the spoiler unit 52c mounted thereon fits positively into the end termination unit 14c (cf. FIG. 15). Use can be made here, in particular, of additional spacer webs of the kind indicated, in particular, in FIGS. 15 and 20 by spacings shown between the end termination unit 14c and the wiper strip support 12c and between the end termination unit 14c and the spoiler unit 52c. The spacer webs can be provided, in particular, to compensate for manufacturing and/or assembly tolerances.

In the illustrative embodiment under consideration, the spring strip 10c is connected to the end termination unit 14c in a manner which allows movement in a direction parallel to the principal direction of extent of the spring strip 10c. The spring strip 10c is fixed in the direction parallel to the principal direction of extent only by additional abutment on an adapter 48c and/or on a further end termination unit 14c at a second end of the spring strip 10c.

Figure 21:
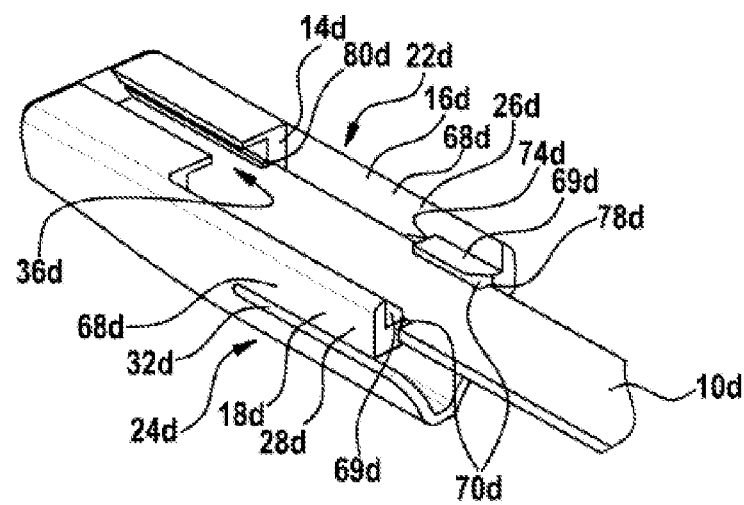
FIG. 21 shows an end termination unit and a spring strip of another wiper blade device in an isometric view from below.
Figure 22:
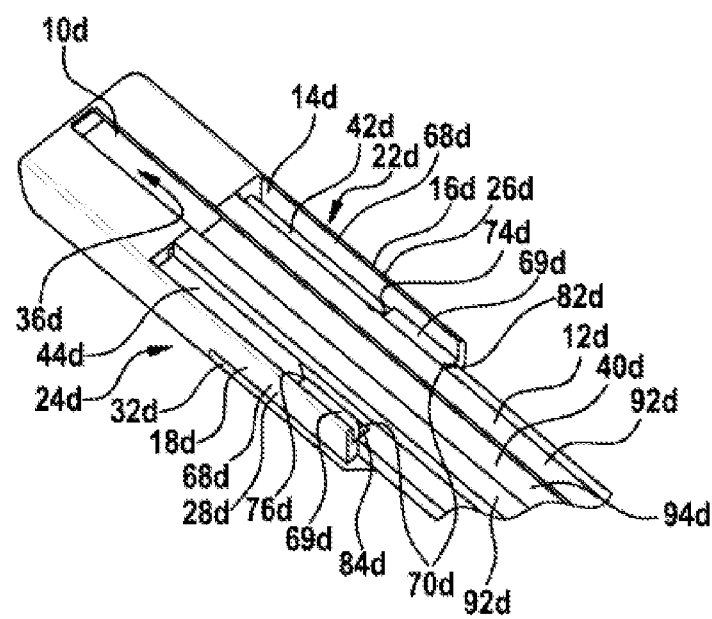
FIG. 22 shows the end termination unit, the spring strip and a wiper strip support of the wiper blade device from FIG. 21 in an isometric view from below.
Figure 23:
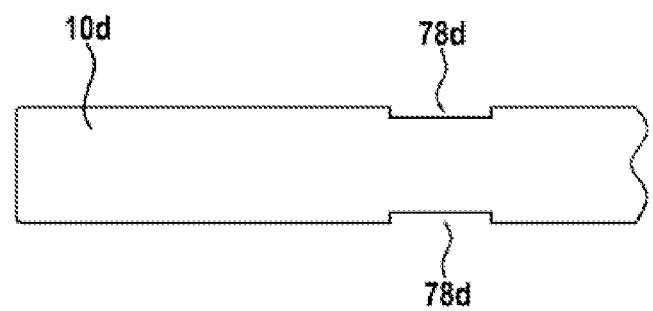
FIG. 23 shows the spring strip of the wiper blade device from FIG. 21 in a plan view.
Figure 24:
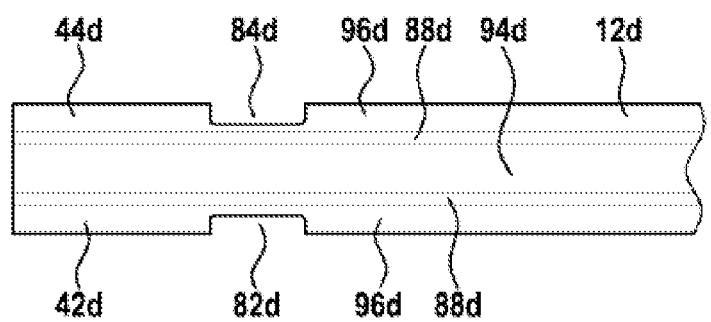
FIG. 24 shows the wiper strip support of the wiper blade device from FIG. 21 in a plan view.

FIG. 21 shows a modification of the previous illustrative embodiment, in which a spring strip 10d is fixed directly in a secure manner on an end termination unit 14d. FIG. 21 shows the end termination unit 14d with the spring strip 10d mounted thereon in an isometric sectional view obliquely from below, wherein a wiper strip support 12d, a wiper strip 38d and a spoiler unit 52d are not shown for the sake of greater clarity. In the illustrative embodiment under consideration, lateral latching apertures 78d are provided on the spring strip 10d (cf. FIG. 23). Latching bodies 69d of latching hooks 26d, 28d are designed in such a way that the latching hooks 26d, 28d are deformed elastically even as the spring strip 10d is pushed in. Once the latching connection has been established, latching surfaces 74d, 76d of the latching bodies 69d interact with corresponding surfaces of the spring strip 10d which bound the latching apertures 78d, thereby preventing the spring strip 10d from being pulled out of the end termination unit 14d. The wiper strip support 12d is latched to the end termination unit 14d in a manner similar to that in the previous illustrative embodiment (cf. FIGS. 22 and 24).

Figure 25:
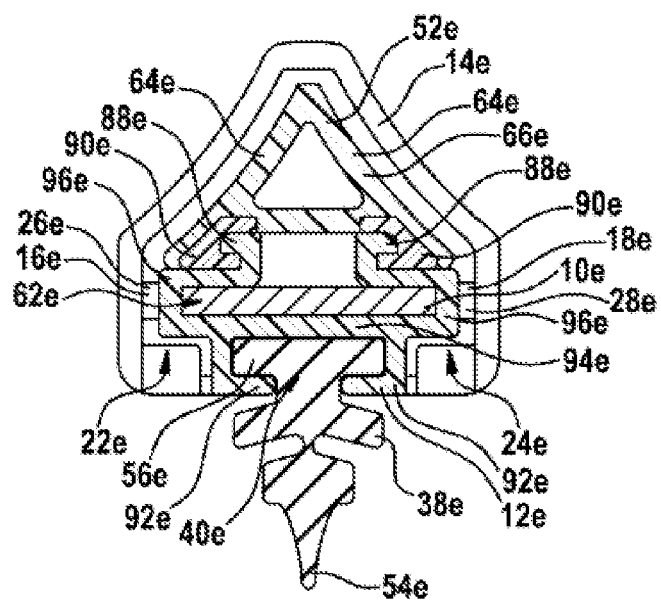
FIG. 25 shows another wiper blade device in a sectional view.
Figure 26:
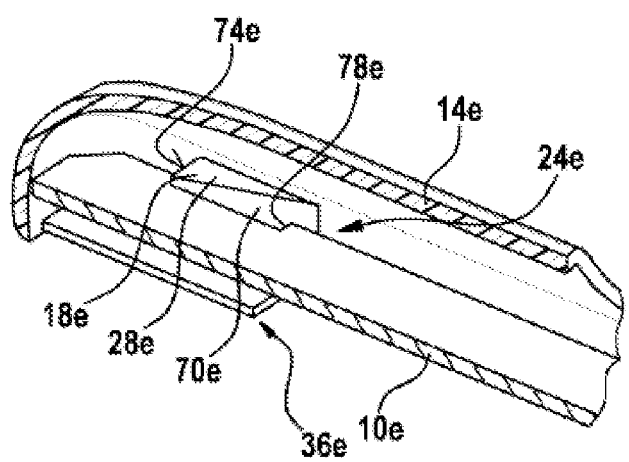
FIG. 26 shows an end termination unit and a spring strip of the wiper blade device from FIG. 25 in an isometric sectional view.

FIG. 25 shows another wiper blade device according to the invention. Two latching elements 16e, 18e designed as latching hooks 26e, 28e are formed on two mutually opposite side walls of an end termination unit 14e. When viewed perpendicularly to a principal plane of extent of a spring strip 10e in an assembled state, the latching hooks 26e, 28e have largely the shape of right angled triangles in their end region (cf. FIG. 26). A surface forming a hypotenuse of the right angled triangles in this view in each case forms a run-on bevel 70e. A surface forming a shorter side of the right angled triangles in said view in each case forms a latching surface 74e, 76e. The spring strip 10e has two lateral, mutually opposite latching apertures 78e. During mounting of the spring strip 10e on the end termination unit 14e, the latching hooks 26e, 28e are deformed elastically by a movement of the spring strip 10e along the run-on bevels 70e. As soon as the latching hooks 26e, 28e are arranged above the latching apertures 78e, the latching hooks 26e, 28e return to their original shape. Once the latching connection has been established, the latching surfaces 74e, 76e of the latching hooks 26e, 28e rest on corresponding surfaces bounding the latching apertures 78e and, in this way, prevent the spring strip 10e from being pulled out of the end termination unit 14e. In the illustrative embodiment under consideration, a wiper strip support 12e is merely pushed onto the spring strip 10e. The wiper strip support 12e is connected to the end termination unit 14e in a manner which allows movement in a direction parallel to the principal direction of extent of the spring strip 10e. The wiper strip support 12e is fixed in the direction parallel to the principal direction of extent merely by additional abutment on an adapter 48e and/or on a further end termination unit 14e at a second end of the spring strip 10e.

A position of the spring strip 10e within the end termination unit 14e perpendicular to the spring strip 10e is defined by stops formed by the wiper strip support 12e and a spoiler unit 52e. In an inner region, the end termination unit 14e is shaped in such a way that the wiper strip support 12e with the spoiler unit 52e mounted thereon fits positively into the end termination unit 14e (cf. FIG. 25). Use can be made here, in particular, of additional spacer webs of the kind indicated, in particular, in FIG. 25 by spacings shown between the end termination unit 14e and the wiper strip support 12e and between the end termination unit 14e and the spoiler unit 52e. The spacer webs can be provided, in particular, to compensate for manufacturing and/or assembly tolerances.

What is claimed is:

1. A wiper blade device comprising at least one spring strip (10a-e), at least one wiper strip support (12a-e) and at least one end termination unit (14a-e), characterized in that the end termination unit (14a-e) comprises at least one first latching element (20a, 20b) that latches the end termination unit (14a-e) to the spring strip (10a-e) and at least one second latching element (16a-e, 18a-e) that latches the end termination unit (14a-e) to the wiper strip support (12a-e), wherein the spring strip (10a-e) extends along a longitudinal direction and defines a first latching aperture (78a) enclosed entirely by the spring strip (10a-e), wherein the at least one first latching element (20a, 20b) is disposed on the end termination unit (14a-e) and is configured to press downward into the first latching aperture (78a) along a direction that is perpendicular to the longitudinal direction, wherein the wiper strip support (12ae) includes second and third latching apertures (82a, 84a), wherein the at least one second latching element (16a-e, 18a-e) includes a plurality of latching elements (16a-e, 18a-e) disposed on the end termination unit (14a-e) that are configured to press into the second and third latching apertures (82a, 84a) along directions that are perpendicular to the longitudinal direction and perpendicular to the direction in which the first latching element (20a) presses into the first latching aperture (78).

2. The wiper blade device as claimed in claim 1, characterized in that the at least one first and the at least one second latching elements (16a-e, 18a-e, 20a; 20b) are each formed on the end termination unit (14a-e).

3. The wiper blade device as claimed in claim 1, characterized in that the at least one second latching element (16a-e, 18a-e) is arranged in at least one side region (22a-e, 24a-e) of the end termination unit (14a-e).

4. The wiper blade device as claimed in claim 1, characterized in that at least one of the at least one first and the at least one second latching elements (16a-e, 18a-e, 20a; 20b) is designed as a latching hook (26a-e, 28a-e, 30a; 30b).

5. The wiper blade device at least as claimed in claim 4, characterized in that the end termination unit (14c; 14d) has at least one aperture (32c, 34c; 32d, 34d) to increase flexibility of the latching hook (26c, 28c;26d, 28d).

6. The wiper blade device as claimed in claim 1, characterized in that the end termination unit (14a-e) has a receiving region (36a-e) for a wiper strip (38a-e), which region, in an assembled state, continues a receiving region (40a-e), arranged on the wiper strip support (12a-e), for the wiper strip (38a-e).

7. The wiper blade device as claimed in claim 6 further comprising a wiper strip received in the receiving region (36a-e) of the end termination unit and in the receiving region (40a-e) of the wiper strip support (12a-e).

8. The wiper blade device as claimed in claim 1, characterized in that the wiper strip support (12a-e) has at least one latching element (42a-d, 44a-d) for fastening the end termination unit (14a-d) to the wiper strip support (12a-d).

9. A wiper blade (46a-e) having a wiper blade device as claimed in claim 1.

10. The wiper blade device as claimed in claim 1, wherein the at least one first latching element (20a, 20b) is latched to the spring strip (10a-e) and the at least one second latching element (16a-e, 18a-e) is latched to the wiper strip support (12a-e).

11. The wiper blade device as claimed in claim 1, wherein the wiper strip support (12a-e) defines a longitudinal guide channel, wherein the spring strip (10a-e) extends through the longitudinal guide channel.

* * * * *